(12) United States Patent
Westerink et al.

(10) Patent No.: US 8,777,310 B2
(45) Date of Patent: Jul. 15, 2014

(54) SEAT BACK ASSEMBLY

(75) Inventors: Rik Westerink, Corinth, TX (US); Jeffrey P. Wegenka, Carrolton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 399 days.

(21) Appl. No.: 13/167,361

(22) Filed: Jun. 23, 2011

(65) Prior Publication Data

US 2011/0316311 A1 Dec. 29, 2011

Related U.S. Application Data

(60) Provisional application No. 61/357,546, filed on Jun. 23, 2010.

(51) Int. Cl.
*A47C 7/62* (2006.01)

(52) U.S. Cl.
USPC .................................... 297/217.3; 297/188.04

(58) Field of Classification Search
USPC .............................. 297/217.3, 188.01, 188.04
See application file for complete search history.

(56) References Cited

U.S. PATENT DOCUMENTS

| | | | |
|---|---|---|---|
| 3,615,118 A | 10/1971 | Buxton | |
| 3,773,381 A | 11/1973 | Brennan | |
| 3,795,422 A | 3/1974 | Robinson et al. | |
| 4,281,874 A | 8/1981 | Iwans et al. | |
| 4,836,602 A | 6/1989 | D'Almada Remedios et al. | |
| 5,529,265 A * | 6/1996 | Sakurai | 244/118.5 |
| 6,666,149 B1 * | 12/2003 | Lathrop | 108/44 |
| 7,287,817 B2 | 10/2007 | Goldman | |
| 7,611,198 B2 * | 11/2009 | Schweizer | 297/217.3 |
| 8,141,948 B2 * | 3/2012 | Cassellia et al. | 297/217.3 |
| 2003/0193220 A1 | 10/2003 | Jensen | |
| 2004/0100137 A1 | 5/2004 | Johnson | |

(Continued)

FOREIGN PATENT DOCUMENTS

| | | |
|---|---|---|
| AT | 305040 | 2/1973 |
| DE | 3433589 A1 | 3/1986 |

(Continued)

OTHER PUBLICATIONS

International Preliminary Report on Patentability dated Jan. 10, 2013 in Application No. PCT/US2011/041570.

(Continued)

*Primary Examiner* — Sarah B McPartlin
(74) *Attorney, Agent, or Firm* — Kilpatrick Townsend & Stockton LLP; Dean W. Russell, Esq.; Tiffany L. Williams, Esq.

(57) ABSTRACT

Described are seat back assemblies including a seat back with a recess and a bezel assembly having a bezel pivotally coupled to the recess and configured to substantially fit within the recess. Other examples may include a tray table assembly pivotally coupled to a lower section of the seat back. As examples, a protective covering may be positioned between the seat back and the bezel assembly, wherein the protective covering is a full shroud or a partial shroud. The protective covering may be coupled to the seat back via the coupling between the seat back and the bezel assembly without additional fasteners and may also include a shelf positioned below the bezel. Other examples may include an amenity tray positioned adjacent the bezel assembly.

16 Claims, 14 Drawing Sheets

(56) References Cited

U.S. PATENT DOCUMENTS

| | | |
|---|---|---|
| 2004/0124675 A1 | 7/2004 | Ingram et al. |
| 2004/0239155 A1* | 12/2004 | Fourrey et al. ............... 297/163 |
| 2005/0077070 A1 | 4/2005 | Geelhaar et al. |
| 2005/0132407 A1* | 6/2005 | Boyer et al. .................... 725/77 |
| 2006/0175882 A1 | 8/2006 | Schweizer |
| 2008/0238169 A1* | 10/2008 | Hicks et al. ................... 297/353 |
| 2008/0252111 A1* | 10/2008 | Rothkop et al. ......... 297/188.04 |
| 2011/0187163 A1 | 8/2011 | Westerink et al. |

FOREIGN PATENT DOCUMENTS

| | | |
|---|---|---|
| FR | 2855472 A1 | 12/2004 |
| WO | 9109778 | 7/1991 |
| WO | 9904381 | 1/1999 |
| WO | 2011041760 A2 | 4/2011 |
| WO | 2011094668 | 8/2011 |
| WO | WO2011094668 | 8/2011 |
| WO | 2011163440 | 12/2011 |

OTHER PUBLICATIONS

International Search Report and Written Opinion dated Dec. 23, 2011 in Application No. PCT/US2011/041570.
International Preliminary Report on Patentability dated Aug. 9, 2012 in Application No. PCT/US2011/023124.
International Search Report and Written Opinion dated Aug. 16, 2011 in related Application No. PCT/US2011/023124.
Office Acton dated Jul. 31, 2013 in U.S. Appl. No. 13/017,422.
Office Action dated Apr. 24, 2013 in U.S. Appl. No. 13/017,422.
Response dated May 24, 2013 in U.S. Appl. No. 13/017,422.
Notice of Allowance dated Nov. 29, 2013 in U.S. Appl. No. 13/017,422.

* cited by examiner

SEAT BACK ASSEMBLY

CROSS REFERENCE TO RELATED APPLICATIONS

This application is related to and claims priority benefits from U.S. Provisional Application Ser. No. 61/357,546, filed on Jun. 23, 2010, entitled SHROUD INSTALLATION AND FOOD TRAY SYSTEM INSIDE AN RECLINING SEAT-BACK FOR AIRCRAFT. The '546 application is hereby incorporated in its entirety by this reference.

FIELD OF THE INVENTION

The field of the invention relates to seat back systems for passenger seats or the like.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort and enjoyment, many passenger seat backs are utilized to install amenities for the passenger's use during the trip. For example, an upper surface of the seat back may be used to install In-Flight Entertainment ("IFE") equipment or other entertainment devices and/or as an area for additional storage of amenities, such as reading materials or other devices.

In some instances, a tray table may be mounted adjacent a lower surface of the seat back. The tray table is deployed by the passenger to provide a relatively flat surface for eating, working, recreation, or other uses.

Conventionally, these entertainment devices, amenities, and/or tray tables have been mounted to an exterior surface of the seat back, which often encroaches on the space available to the aft-seated passenger. In certain situations, it may be desirable to reduce the passenger space occupied by the entertainment device, amenities, and/or tray table when the tray table is stowed. It may also be desirable to provide a way to adjust the tilt of the entertainment device for more comfortable viewing by the passenger.

SUMMARY

Embodiments of the present invention include a seat back assembly comprising a seat back with a recess and a bezel assembly having a bezel pivotally coupled to the recess and configured to substantially fit within the recess. In some embodiments, the bezel is pivotally coupled to the recess via at least one hinge coupled to the bezel. The bezel assembly may further comprise a tilt attachment plate coupled to the hinge and the seat back. In some embodiments, the bezel assembly has a thickness that approximates a depth of the recess.

In other embodiments, the seat back assembly may comprise a seat back comprising an upper section and a lower section, a bezel assembly having a bezel pivotally coupled to the upper section and configured to substantially fit within the upper section, and a tray table assembly pivotally coupled to the lower section. In some embodiments, the bezel is pivotally coupled to the upper section via at least one hinge coupled to the bezel. The bezel assembly may further comprise a tilt attachment plate coupled to the hinge and the seat back. In some embodiments, the bezel assembly has a thickness that approximates a depth of the upper section.

The seat back assembly may further comprise a protective covering positioned between the seat back and the bezel assembly, wherein the protective covering is a full shroud or a partial shroud. The protective covering may be coupled to the seat back via the coupling between the seat back and the bezel assembly without additional fasteners. The protective covering may further comprise a shelf positioned below the bezel. The seat back assembly may further comprise an amenity tray positioned adjacent the bezel assembly.

The bezel assembly may be assembled to a seat back by coupling an in-flight entertainment display to the bezel, coupling the bezel to a tilt bracket, and coupling the tilt attachment plate to the seat back. In some embodiments, a stiffener may be coupled to the tilt bracket. In other embodiments, the protective covering may be positioned between the seat back and the bezel assembly prior to coupling the tilt attachment plate to the seat back, wherein the protective covering is a full shroud or a partial shroud.

DETAILED DESCRIPTION

Figure 1:
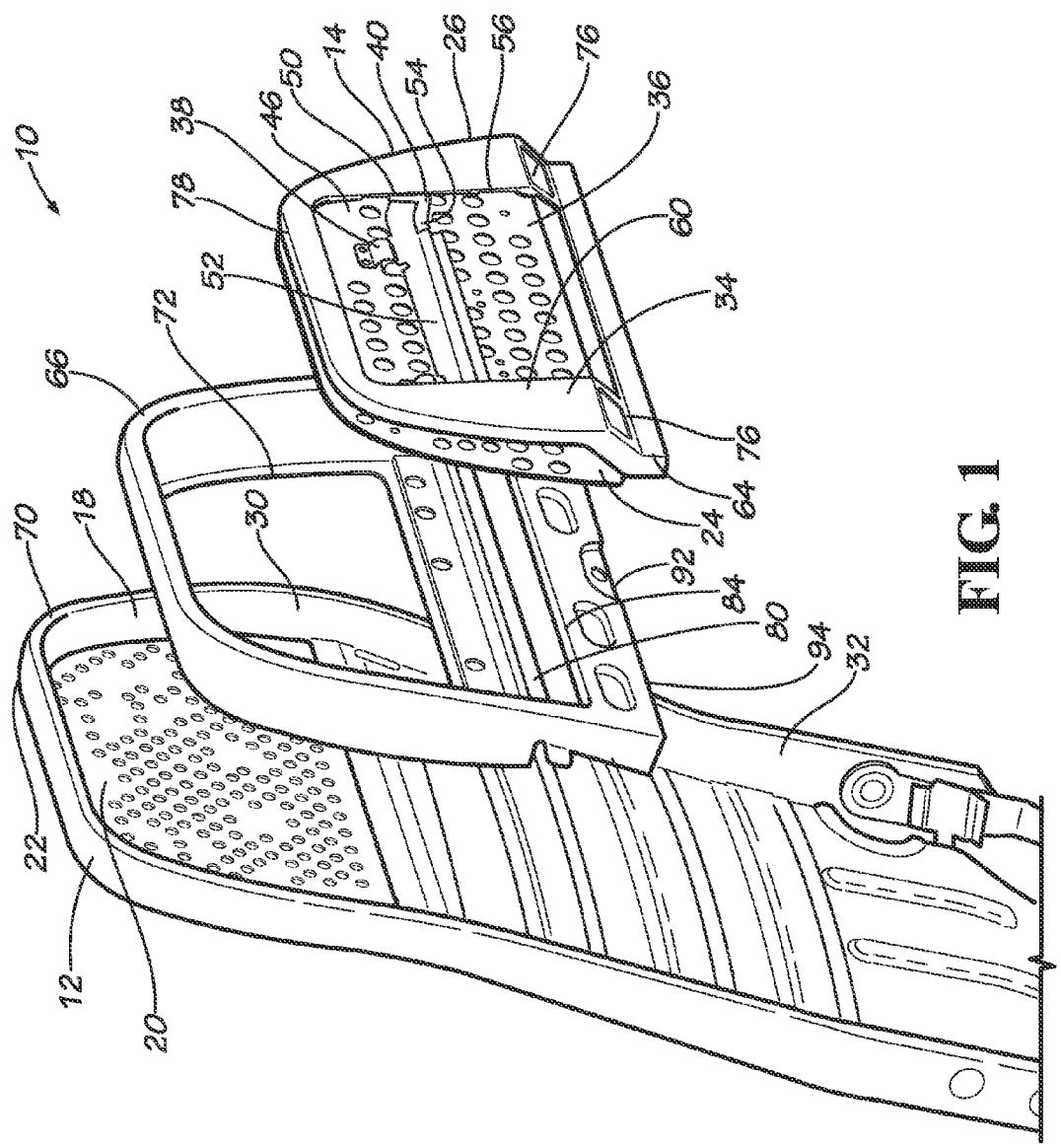
FIG. 1 is an exploded front perspective view of a seat back assembly according to one embodiment of the present invention.
Figure 2:
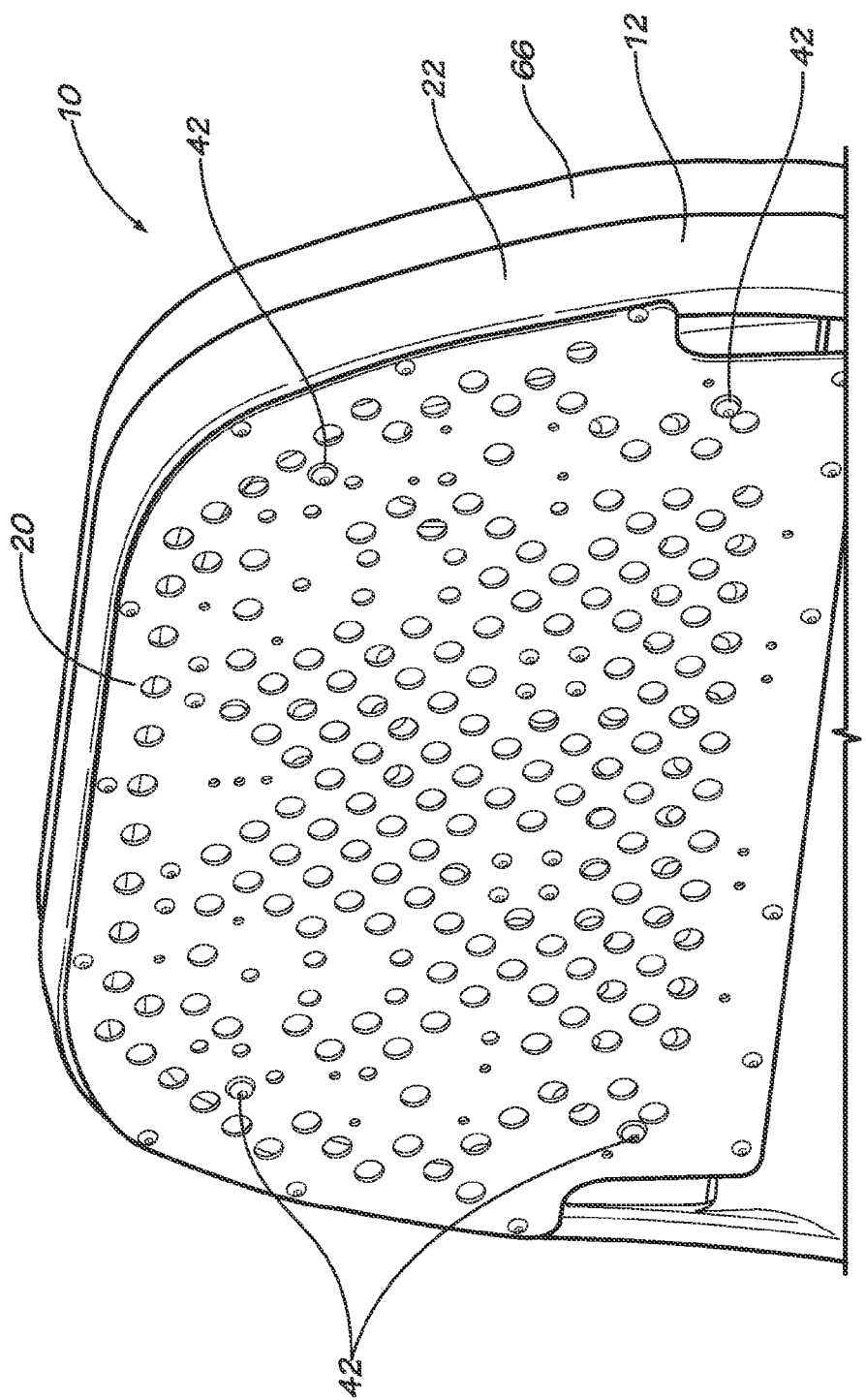
FIG. 2 is a partial back perspective view of the seat back assembly of FIG. 1.
Figure 3:
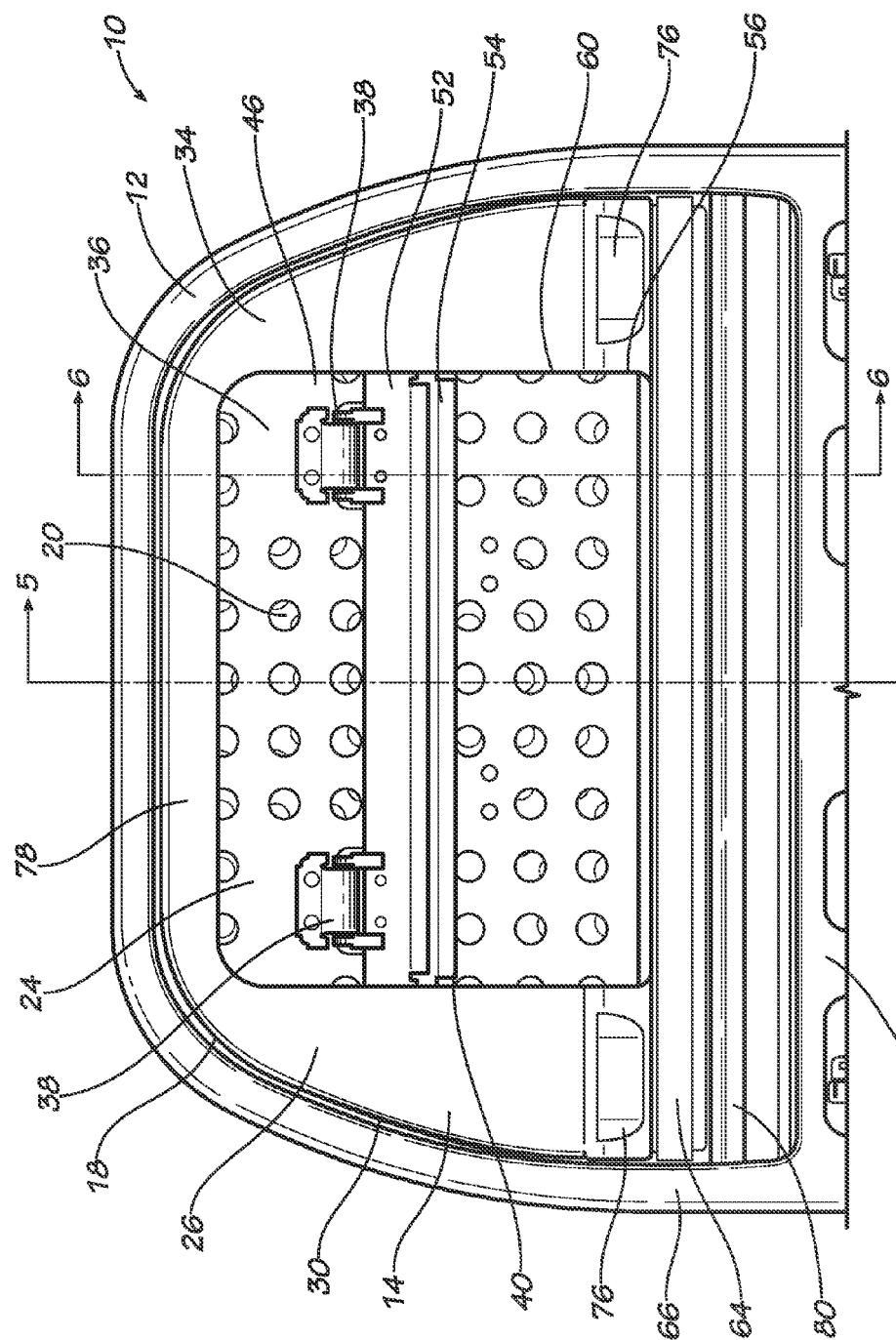
FIG. 3 is a partial front view of the seat back assembly of FIG. 1.
Figure 4:
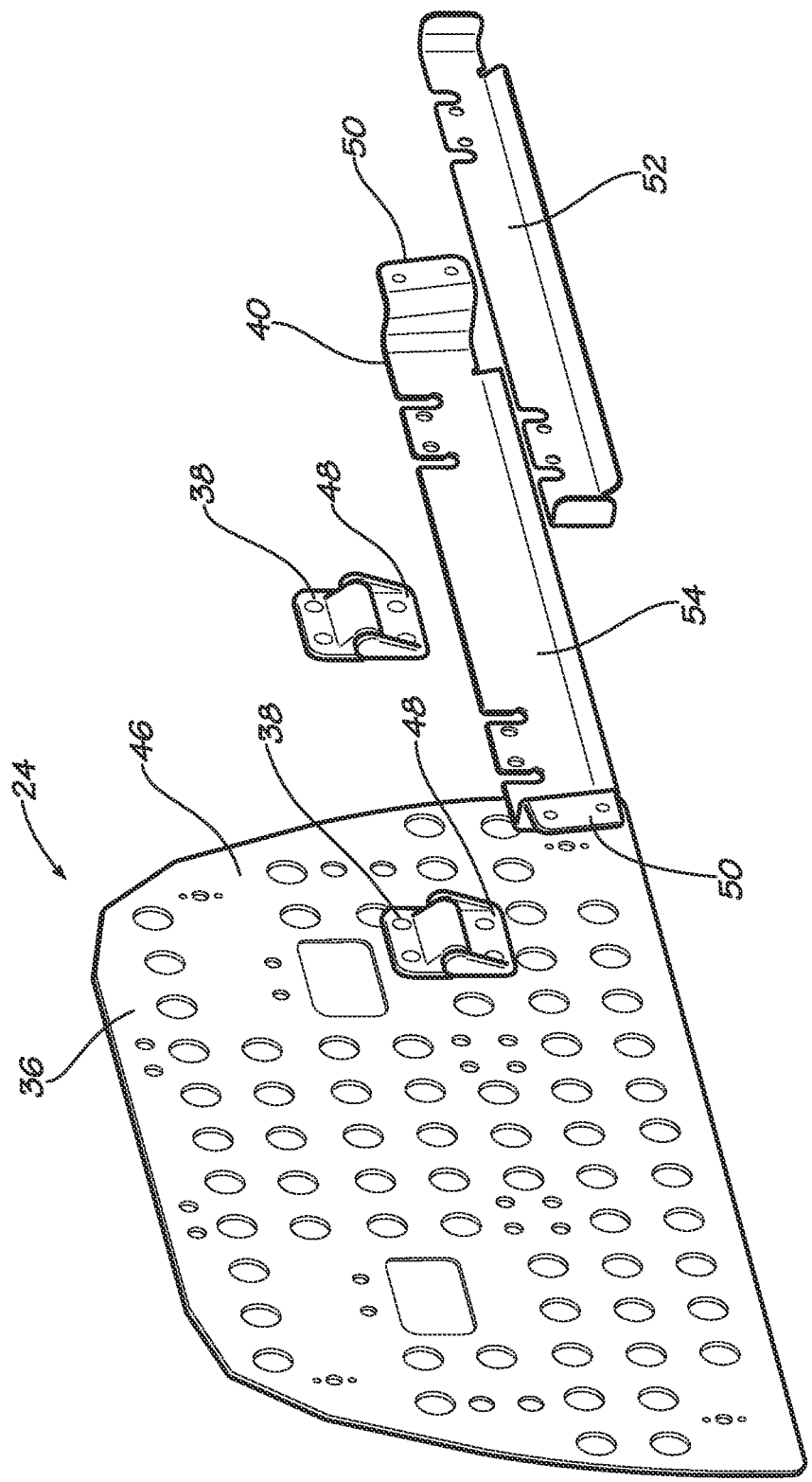
FIG. 4 is an exploded front perspective view of a subassembly of the seat back assembly of FIG. 1.
Figure 5:
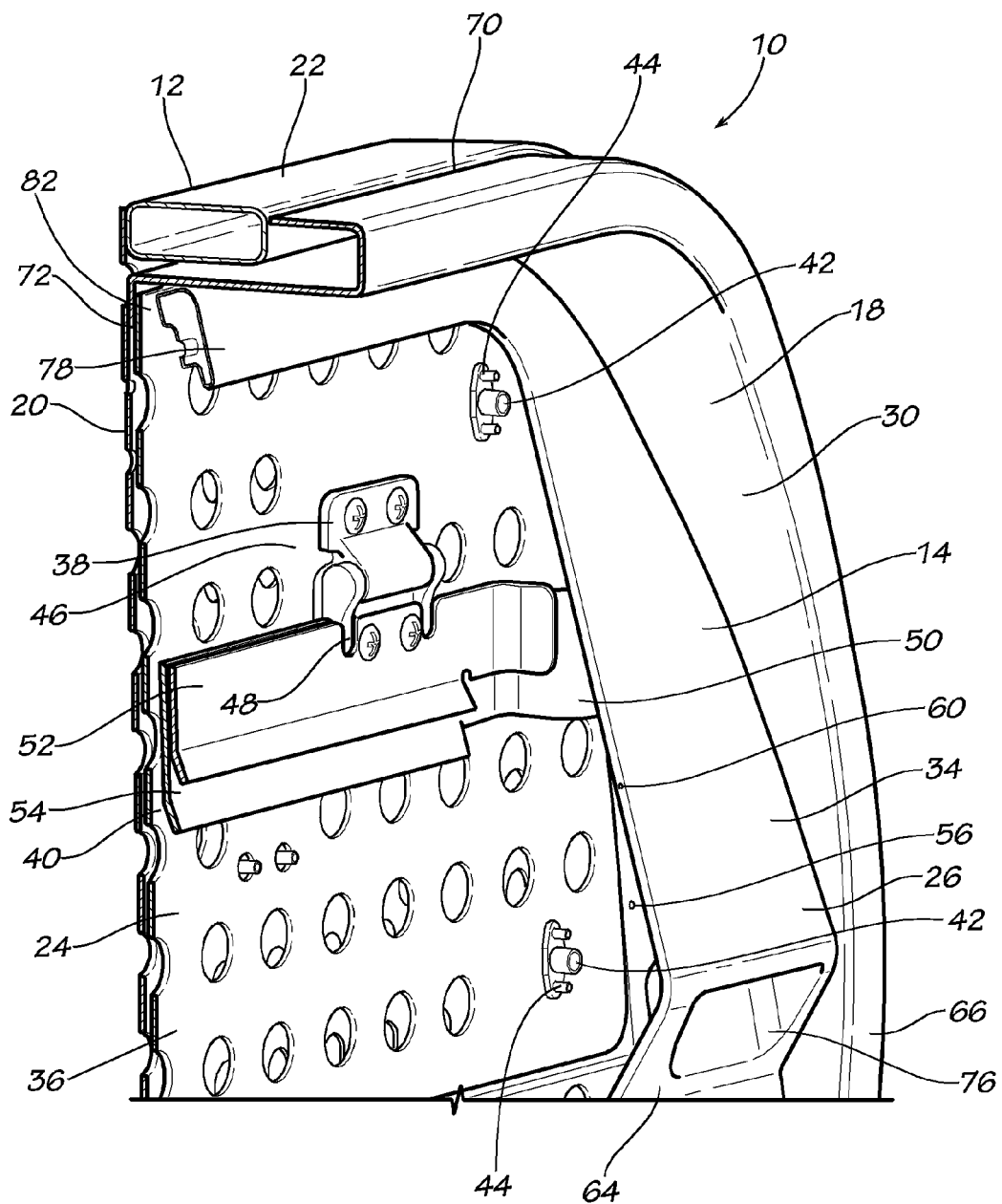
FIG. 5 is a partial cross-sectional front perspective view of the seat back assembly of FIG. 3 taken along line 5-5.
Figure 6:
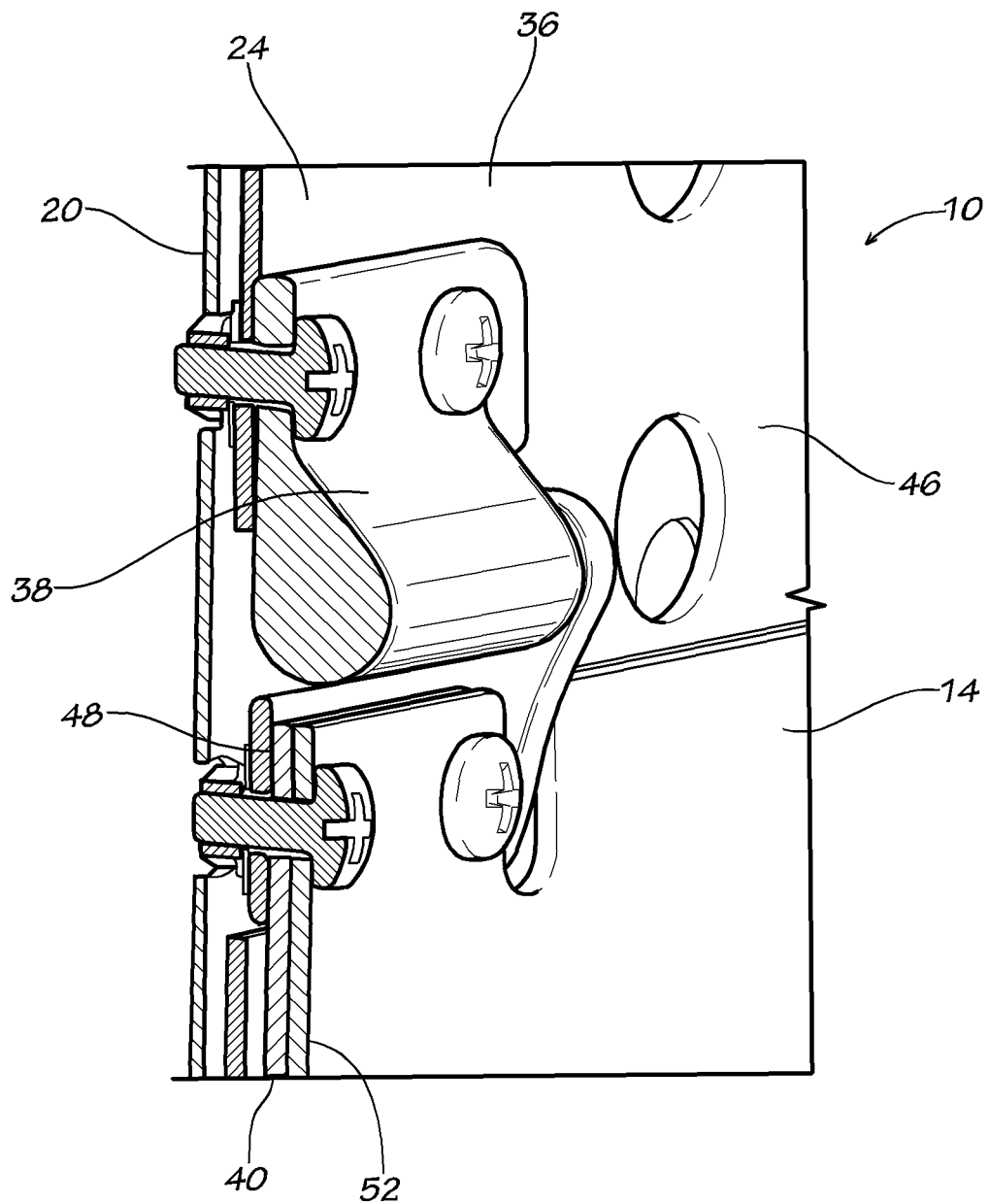
FIG. 6 is a partial cross-sectional front perspective view of the seat back assembly of FIG. 3 taken along line 6-6.
Figure 7:
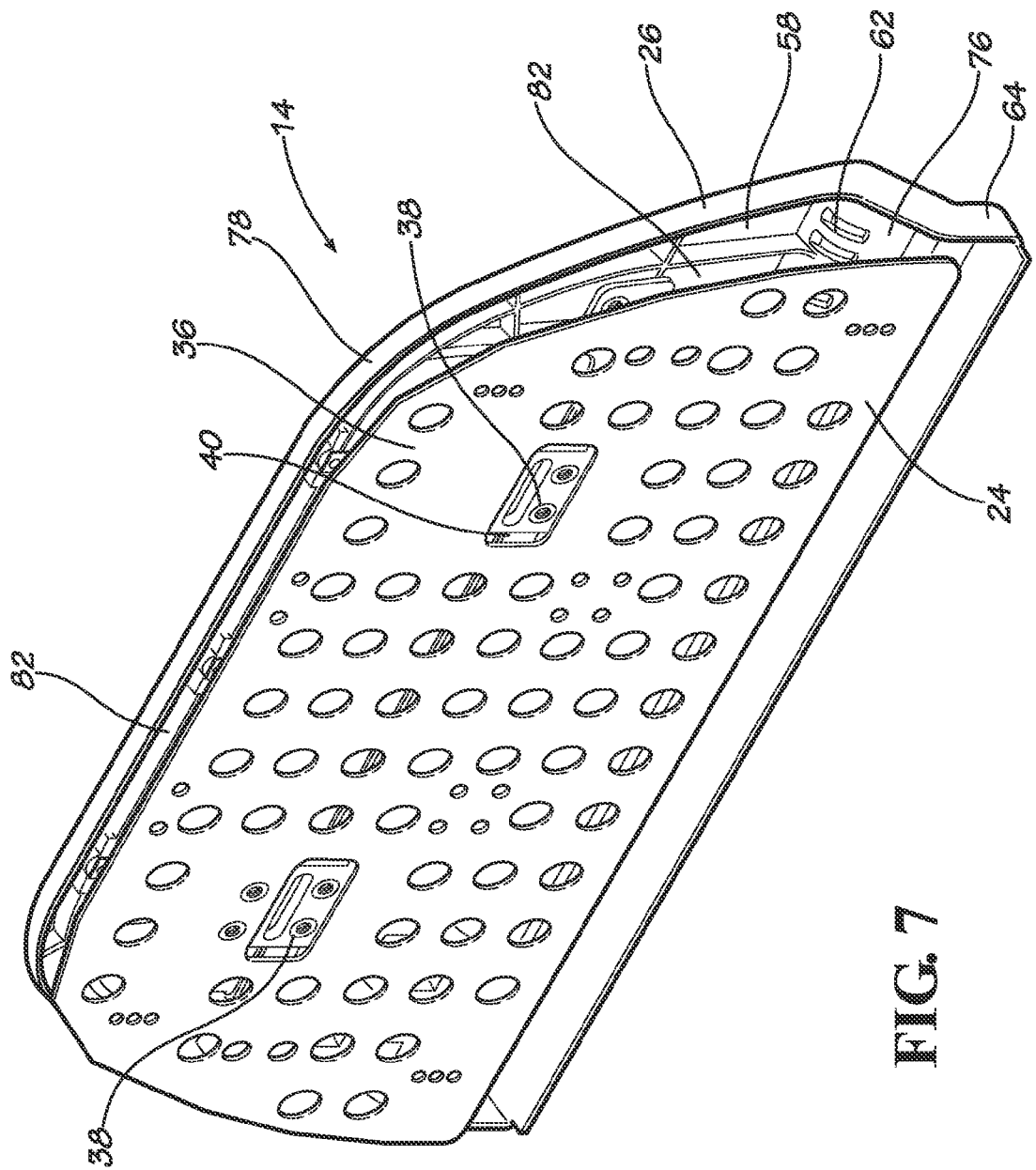
FIG. 7 is a back perspective view of a bezel assembly of the seat back assembly of FIG. 1.
Figure 8:
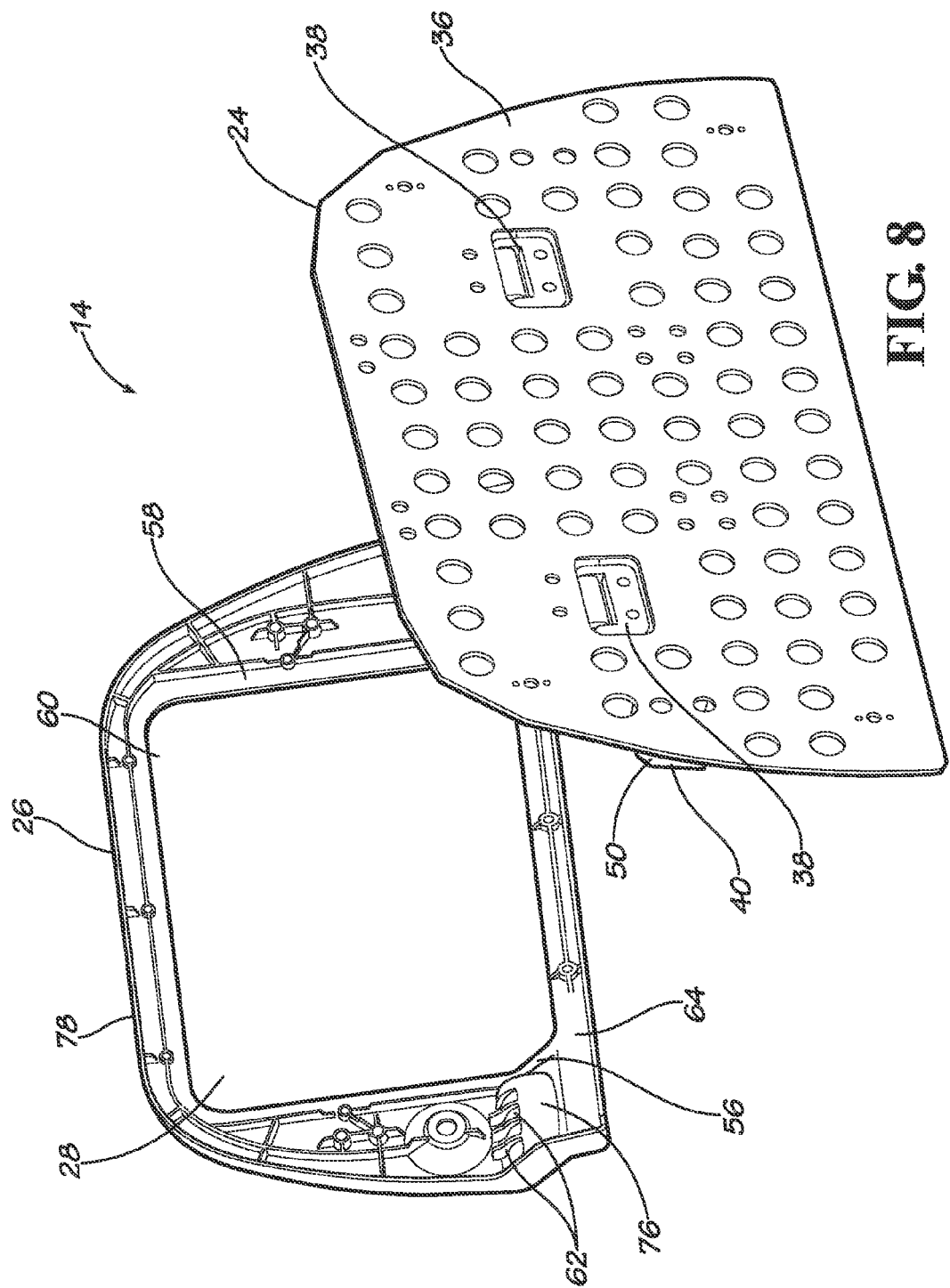
FIG. 8 is an exploded back perspective view of the bezel assembly of FIG. 7.
Figure 9:
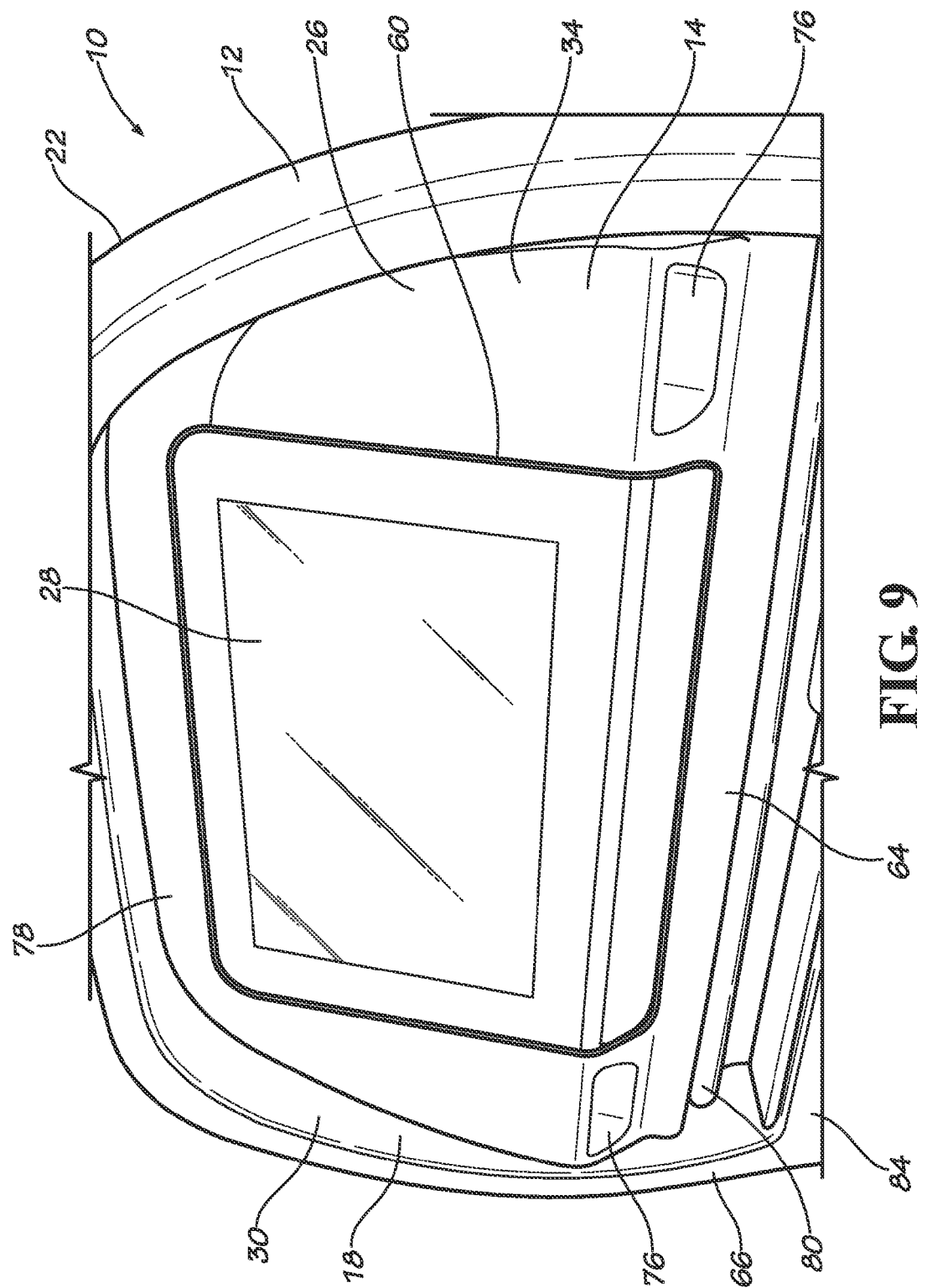
FIG. 9 is a partial front perspective view of the seat back assembly of FIG. 1 with a in-flight entertainment display.

Embodiments of the invention provide seat back assemblies for use with a passenger seat. While the seat back assemblies are discussed for use with aircraft seats, they are by no means so limited. Rather, embodiments of the seat back assemblies may be used in passenger seats or other seats of any type or otherwise as desired.

FIGS. 1-14 illustrate embodiments of a seat back assembly 10. The seat back assembly 10 comprises a seat back 12, a bezel assembly 14, and a tray table assembly 16.

The seat back 12 comprises a recess 18 that may be formed by a back surface 20 surrounded on at least three sides by a lip 22. The back surface 20 and the lip 22 may be formed of materials including but not limited to aluminum, stainless steel, other metallic materials, composite materials, or other similar materials. In these embodiments, such as the embodiments best illustrated in FIG. 1, the recess 18 may have any suitable shape including but not limited to rectilinear, trapezoidal, parabolic, or other suitable shape that does not exceed the outer perimeter of the seat back 12. In addition, the recess 18 may have any suitable depth that does not exceed the overall thickness of the seat back 12. In some embodiments, the depth of the recess 18 may have approximately the same dimension as the thickness of the seat back 12. In other embodiments, the depth of the recess 18 may be less than the thickness of the seat back 12.

In some embodiments, such as the embodiments illustrated in FIGS. 1-14, the bezel assembly 14 comprises a sub-assembly 24, a bezel 26, and an IFE display 28. In these embodiments, the bezel assembly 14 is coupled to an upper section 30 of the recess 18, and the tray table assembly 16 is coupled to a lower section 32 of the recess 18. The bezel assembly 14 is configured to substantially stow within the upper section 30 of the recess 18. The bezel assembly 14 may be formed of materials including but not limited to injection molded or thermoformed plastic, aluminum, sheet metal, stainless steel, other metallic materials, composite materials, or other similar materials. In these embodiments, the bezel assembly 14 is shaped to substantially conform to the shape of the upper section 30. In other embodiments, the bezel assembly 14 may have a shape that differs from the shape of the upper section 30, while still fitting within the shape of the upper section 30. For example, the upper section 30 may have a rectilinear shape, while the bezel assembly 14 may have a trapezoidal shape that fits within the rectilinear shape of the upper section 30. As a result, the bezel assembly 14 may have any suitable shape including but not limited to rectilinear, trapezoidal, parabolic, or other suitable shape that fits within the shape of the upper section 30.

Because the bezel assembly 14 is configured to substantially fit within the upper section 30 to minimize the amount of intrusion into the aft-seated passenger's space, the bezel assembly 14 may have any suitable thickness that approximates the depth of the upper section 30. In some embodiments, such as the embodiments illustrated in FIGS. 5 and 9-14, it may be sufficient for a portion of the bezel assembly 14 to be surrounded by the upper section 30, while another portion of the bezel assembly 14 extends into the space outside the upper section 30. In other embodiments, the bezel assembly 14 may have any appropriate depth that allows an aft surface 34 of the bezel 26 to align substantially flush with an outer edge of the upper section 30.

The sub-assembly 24 includes a tilt attachment plate 36, at least one hinge 38, and a tilt bracket 40. The tilt attachment plate 36 forms the back of the bezel assembly 14. The tilt attachment plate 36 may be coupled to the back surface 20 via mechanical fasteners including but not limited to screws, bolts, rivets, or other suitable mechanical fasteners. In the particular embodiments illustrated in FIGS. 2, 5, 11-12, and 14, the tilt attachment plate 36 is coupled to the back surface 20 via threaded fasteners 42 and nut plates 44. In some embodiments, the tilt attachment plate 36 comprises a plurality of apertures that both reduce the overall weight of the bezel assembly 14 and provide locations for rivet clearance when the bezel assembly 14 is coupled to the back surface 20.

The hinge 38 is coupled to an aft surface 46 of the tilt attachment plate 36. In some embodiments, such as the embodiments shown in FIGS. 1, 3-5, 7-8, 11-12, and 14, the hinge 38 is positioned approximately at, or slightly above, the vertical mid-point of the tilt attachment plate 36. However, other suitable locations on the tilt attachment plate 36 are envisioned. For example, the hinge 38 may be positioned higher or lower than the vertical mid-point of the tilt attachment plate 36 to adjust the amount of tilt available.

In the embodiments shown in FIGS. 1, 3-5, 7-8, 11-12, and 14, the hinge 38 is a friction hinge, which relies on a constant friction force within the hinge 38 to hold its position throughout the full range of motion. In these embodiments, the hinge 38 is mounted with a horizontal axis of rotation. Suitable torque ranges for the hinge 38 may be 1 in-lb to 3 in-lb. However, one of ordinary skill in the relevant art will understand that any suitable torque range may be used that provides sufficient torque to overcome the torque generated by all the forces acting on the bezel assembly 14, so that the hinge 38 may hold the bezel assembly 14 in position with no external load, while still allowing a suitable range of external force to be applied to overcome the hinge torque and move the bezel assembly 14 into another position within its range of motion.

In other embodiments, the hinge 38 may be a detent hinge, which provides for repeatable soft stops in one or more positions over the entire range of motion. In yet other embodiments, the hinge 38 may be a standard hinge that is combined with a positioning lock that is engaged when the bezel assembly 14 reaches the desired location.

The tilt bracket 40 is coupled to an end 48 of each hinge 38. The tilt bracket 40 also includes projections 50 at each end of the tilt bracket 40 that are configured to couple the tilt bracket 40 to the bezel 26. In some embodiments, the tilt bracket 40 has a thin cross-sectional shape that minimizes the amount of material required to form the tilt bracket 40, which also reduces the weight of the tilt bracket 40. In these embodiments, depending on the load applied by the bezel assembly 14, a stiffener 52 may be coupled to an aft surface 54 of the tilt bracket 40 and to the hinges 38. The stiffener 52 may be formed of a lighter material, such as a polymer or other similar material, that provides additional support, but is lighter than a thicker version of the tilt bracket 40 that would otherwise be required to provide a similar amount of support.

Alternatively, in other embodiments where less structural support is required or where weight of the bezel assembly 14 may not be as much of a concern, the tilt bracket 40 may be configured to provide sufficient support with a thinner cross-sectional shape or the cross-sectional shape may be thickened as needed to provide the desired support, so that the stiffener 52 is not required.

Figure 11:
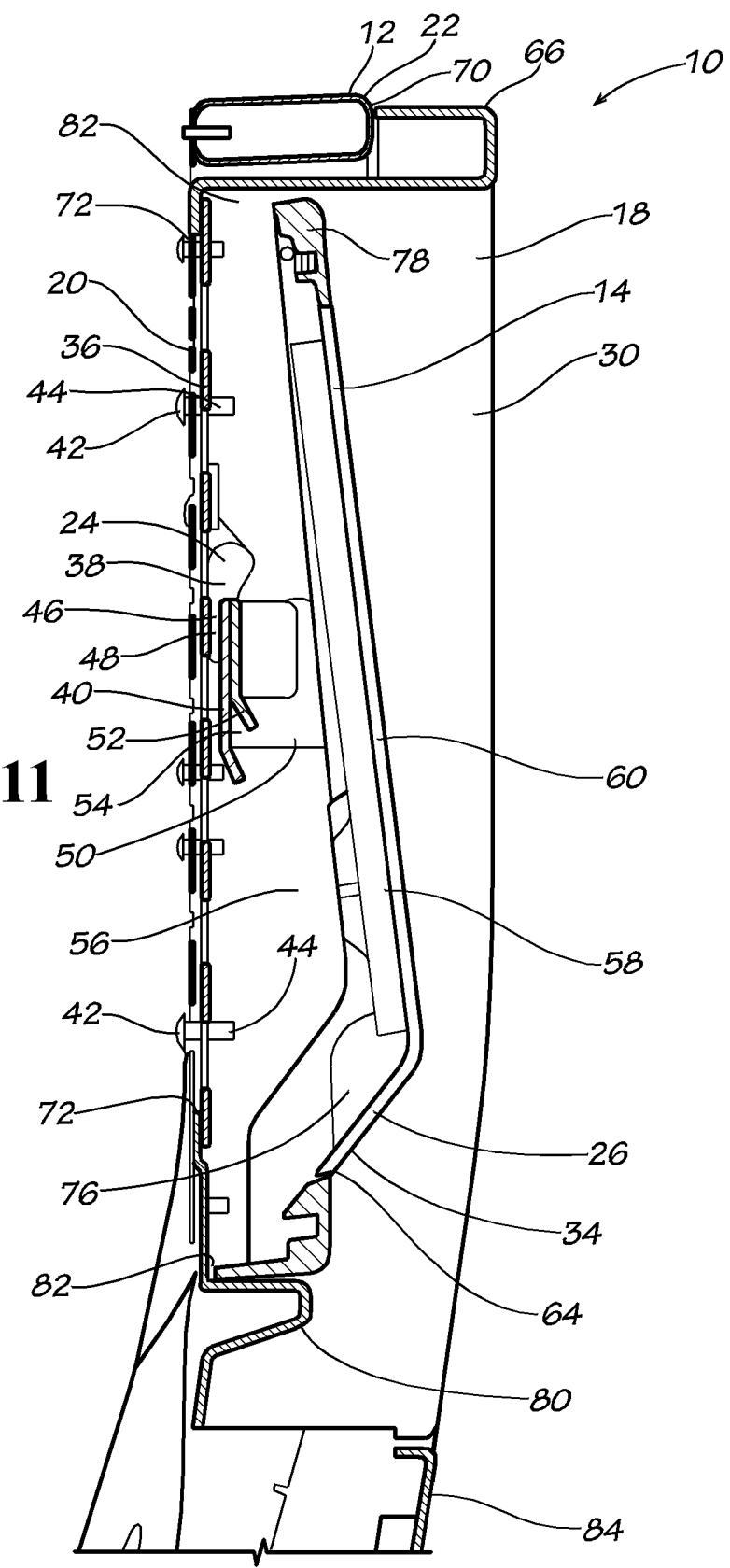
FIG. 11 is a cross-sectional view of the seat back assembly of FIG. 3 taken along line 5-5 with the bezel assembly in a stowed position.

The bezel 26 is configured to form an enclosure 56 between the tilt attachment plate 36 and a forward surface 58 of the bezel 26. The enclosure 56 is shaped to secure the IFE display 28. The IFE display 28 may be a display for an IFE or other entertainment devices. The aft surface 34 also includes an aperture 60 to ensure that the IFE display 28 is visible when positioned within the enclosure 56. In some embodiments, the aft surface 34 is angled so that the IFE display 28 is tilted upward for better viewing by a passenger seated in the passenger located aft of the seat back 12 when the bevel assembly 14 is in a stowed position (as shown in FIG. 11).

The IFE display 28 is coupled to the forward surface 58 of the bezel 26 via any suitable mechanical fasteners including but not limited to screws, bolts, or other similar fastening devices. The forward surface 58 of the bezel 26 also includes locations to couple the bezel 26 to the projections 50 of the tilt bracket 40 via any suitable mechanical fasteners including but not limited to screws, bolts, rivets, or other similar fastening devices. In some embodiments, a screwdriver is inserted through apertures in the tilt attachment plate 36 to attach mechanical fasteners to the projections 50 of the tilt bracket 40 and the forward surface 58 of the bezel 26. However, one of ordinary skill in the relevant art will understand that any suitable attachment method and/or fasteners may be used to couple the projections 50 of the tilt bracket 40 to the forward surface 58 of the bezel 26.

To improve cooling of the IFE display 28, the bezel assembly 14 is often used in combination with a shroud 66. In some instances, depending on the type of device being secured and the amount of heat generated by that device, the bezel assembly 14 may also be used in combination with a dress cover only (not shown). The dress cover may be formed of materials including but not limited to leather, fabric, or other similar upholstery materials.

In these embodiments, the shroud 66 may be installed between the bezel assembly 14 and the seat back 12. The shroud 66 is typically formed of a material that resists stains and is easily and quickly sanitized between passenger uses. Suitable materials for forming the shroud 66 include but are not limited to plastics (vacuum-formed, injection molded, or thermoformed), such as polycarbonate, polyethylene, polypropylene, polyvinyl chloride, or other similar plastics, metallic materials, composite materials, or other similar materials. As a result, the shroud 66 provides a protective covering for at least a portion of the seat back 12.

In these embodiments, the shroud 66 is coupled to at least a portion of the seat back 12. FIGS. 1-3, 5, 9-10, and 13 illustrates the use of the bezel assembly 14 in combination with a partial shroud 66 embodiment, which is shaped to substantially conform to at least an outer perimeter of the upper section 30 and an aft surface 70 of the lip 22. FIG. 14 illustrates the use of the bezel assembly 14 in combination with a full shroud 66 embodiment, which extends downward to also substantially conform to the back surface 20 of the lower section 32 of the recess 18 and the aft surface 70 of the lip 22. Any portions of the back surface 20 not covered by the shroud 66 are typically enclosed with the dress cover (not shown).

The portion of the shroud 66 located in the upper section 30 is shaped to cover the outer perimeter shape of the upper section 30, but may include an aperture 72 in the region behind the bezel assembly 14. The shroud 66 material is not included behind the bezel assembly 14 because it does not provide additional aesthetic or protective benefit and adds unnecessary weight to the shroud 66. The aperture 72 also provides an area through which the tilt attachment plate 36 may couple to the back surface 20. The shroud 66 is pulled snugly against the back surface 20 by the coupling of the bezel assembly 14 to the upper section 30 without the need for additional fasteners. In the full shroud embodiment, as illustrated in FIG. 14, additional fasteners may be used to secure the shroud 66 to the lower section 32 of the recess 18.

In the embodiments shown in FIGS. 1-14, the bezel 26 includes at least one tilt access port 76 in a lower surface 64. In the embodiments illustrated in FIGS. 1, 3, 5, 9, and 13-14, the bezel 26 includes two tilt access ports 76. In the embodiment illustrated in FIG. 10, the bezel 26 includes one tilt access port 76. However, one of ordinary skill in the relevant art will understand that any suitable number and locations of tilt access ports 76 may be included with the bezel 26. The tilt access port 76 may include slots 62 for passive cooling of the IFE display 28.

The tilt access port 76 also allows a passenger to adjust the position of the bezel assembly 14 by pulling the lower surface 64 of the bezel 26 toward the passenger to rotate the lower surface 64 of the bezel 26 upward and outward relative to the tilt attachment plate 36. In the embodiments where the hinges 38 are friction hinges, the bezel 26 may be positioned at any desirable angle within the full range of motion. In other embodiments where the hinges 38 are detent hinges, the bezel 26 may be positioned at any of the predetermined soft stops within the full range of motion. The amount of tilt available with the bezel assembly 14 is defined at least by the vertical position of the hinges 38 on the tilt attachment plate 36, the thickness of the hinges 38, and the thickness of the bezel 26.

Figure 12:
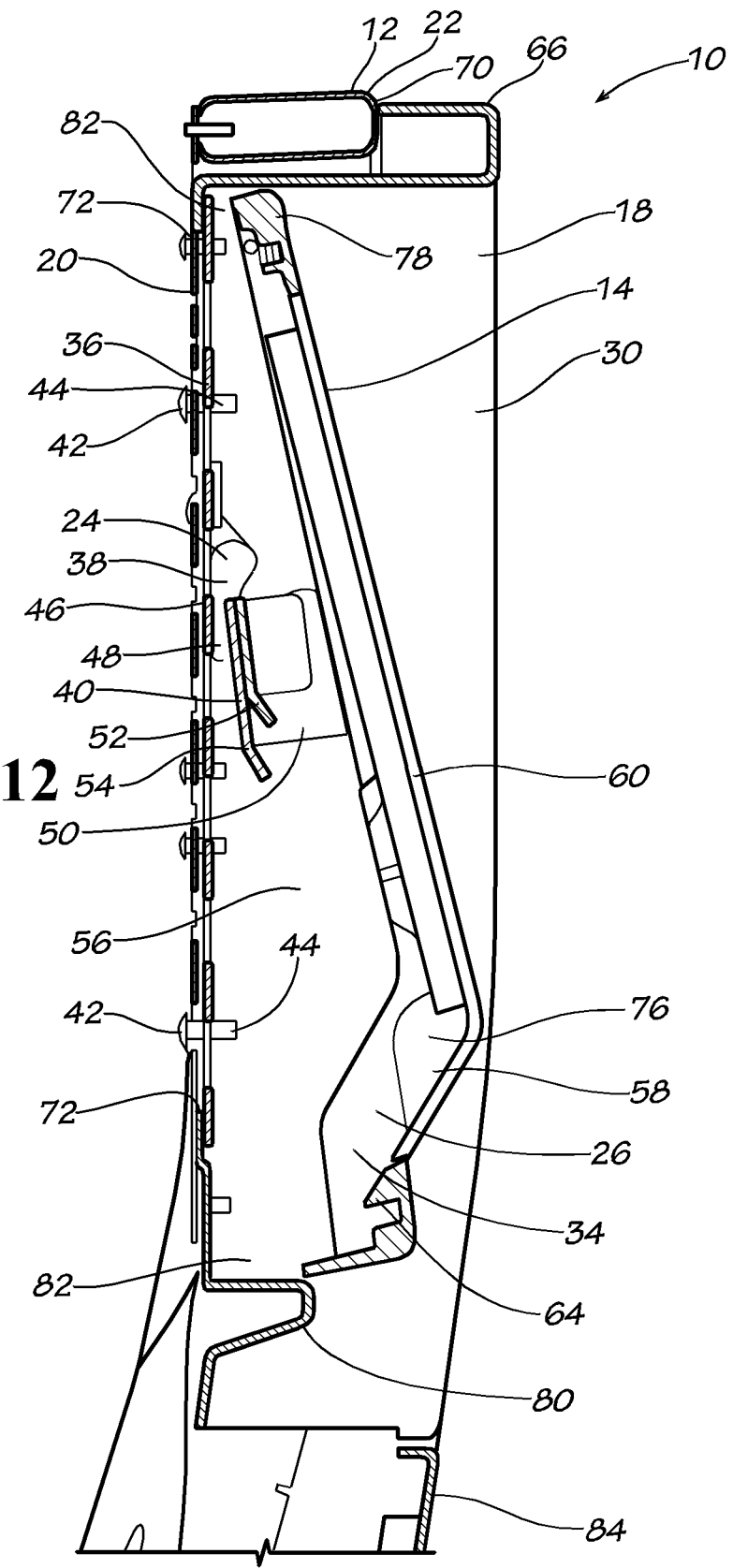
FIG. 12 is a cross-sectional view of the seat back assembly of FIG. 3 taken along line 5-5 with the bezel assembly in a fully tilted position.

In the embodiments illustrated in FIGS. 1-14, the bezel assembly 14 is configured to tilt between a stowed position (as shown in FIG. 11) and a fully tilted position (as shown in FIG. 12). In the stowed position, the lower surface 64 of the bezel 26 is positioned in proximate contact with the shroud 66, so that there is almost no gap 82 between the lower surface 64 of the bezel 26 and the shroud 66. In the stowed position, the gap 82 between the upper surface 78 of the bezel 26 and the tilt attachment plate 36 is at its maximum dimension.

When the bezel assembly 14 is tilted to the fully tilted position, the upper surface 78 of the bezel 26 is positioned in proximate contact with the tilt attachment plate 36 so that there is almost no gap 82 between the upper surface 78 of the bezel 26 and the tilt attachment plate 36. In the fully tilted position, the gap 82 between the lower surface 64 of the bezel 26 and the shroud 66 is at its maximum dimension.

In some embodiments, up to approximately seven degrees of tilt may be available between the stowed and fully tilted positions of the bezel assembly 14. However, one of ordinary skill in the relevant art will understand that any suitable amount of tilt may be achieved by adjusting the various parameters and thicknesses of the components of the bezel assembly 14. For example, adjusting the vertical position of the hinge 38 on the tilt attachment plate 36, as well as the thickness of the hinge 38 itself, adjusts the amount of tilt on either side of the hinge 38. Likewise, the amount of travel before the bezel 26 contacts either the tilt attachment plate 36 (by the upper surface 78) or the shroud 66 (by the lower surface 64) may be adjusted by altering the thickness of the bezel 26 and/or the shape of the upper surface 78 and/or the shape of the lower surface 64.

In order to prevent passenger tampering with the IFE display 28 and/or pinch points created by the movement of the bezel assembly 14, access to the gap 82 between the bezel 26 and the tilt attachment plate 36 may be prevented by surrounding the gap 82 on all sides. In the embodiments shown in FIGS. 1-3, 5, and 9-14, the shroud 66 is shaped to extend around the bezel assembly 14 throughout the full range of motion on both the upper end and sides of the bezel assembly 14. In these embodiments, a portion of the bezel assembly 14 is surrounded by the upper section 30, while another portion of the bezel assembly 14 is surrounded by the thickness of the shroud 66 adjacent the aft surface 70 of the lip 22. The thickness of the shroud 66 adjacent the aft surface 70 of the lip 22 may be increased or decreased as needed, depending on the distance traveled by the bezel assembly 14 throughout the full range of motion. For example, where the bezel assembly 14 has a shorter range of motion, the thickness of the shroud 66 adjacent the aft surface 70 of the lip 22 may be reduced because a thinner shroud 66 is needed to ensure that the full range of motion of the bezel assembly 14 is protected. In contrast, where the bezel assembly 14 has a longer range of motion, the thickness of the shroud 66 adjacent the aft surface 70 of the lip 22 may be increased because a thicker shroud 66 is needed to ensure that the full range of motion of the bezel assembly 14 is protected.

In some embodiments, the shroud 66 also includes a shelf 80 that is positioned below the lower surface 64 of the bezel 26. The shelf 80 is dimensioned so that the gap 82 between the lower surface 64 of the bezel 26 and the tilt attachment plate 36 is not accessible throughout the full range of motion of the bezel assembly 14. In other embodiments, such as embodiments where the shroud 66 does not include the shelf 80 or where the bezel assembly 14 is used with the dress cover (not shown), the tilt attachment plate 36 may include the shelf 80 to prevent access to the gap 82 between the bezel 26 and the tilt attachment plate 36 throughout the full range of motion of the bezel assembly 14. Like the thickness of the shroud 66 adjacent the aft surface 70 of the lip 22, the depth of the shelf 80 may be increased or decreased as needed, depending on the distance traveled by the bezel assembly 14 throughout the full range of motion. For example, where the bezel assembly 14 has a shorter range of motion, the depth of the shelf 80 may be reduced because a shallower shelf 80 is needed to ensure that the full range of motion of the bezel assembly 14 is protected. In contrast, where the bezel assembly 14 has a longer range of motion, the depth of the shelf 80 may be increased because a deeper shelf 80 is needed to ensure that the full range of motion of the bezel assembly 14 is protected.

In some embodiments, an amenity tray 84 may be positioned below the shelf 80 to provide storage locations for passenger items. The amenity tray 84 is configured so that the passenger is able to access the tilt access ports 76. The amenity tray 84 may have any suitable size that fits between the bezel assembly 14 and the tray table assembly 16. In some embodiments where the bezel assembly 14 is smaller, the amenity tray 84 may be larger. In other embodiments where a tray table assembly 16 is not included with the seat back assembly 10, the amenity tray 84 may be dimensioned to substantially fit within the lower section 32 of the recess 18.

In some embodiments, the tray table assembly 16 may be positioned below the bezel assembly 14. In these embodiments, the tray table assembly 16 is coupled to the seat back 12 below the bezel assembly 14. The tray table assembly 16 comprises a pair of arms 88 and a table body 90.

Figure 10:
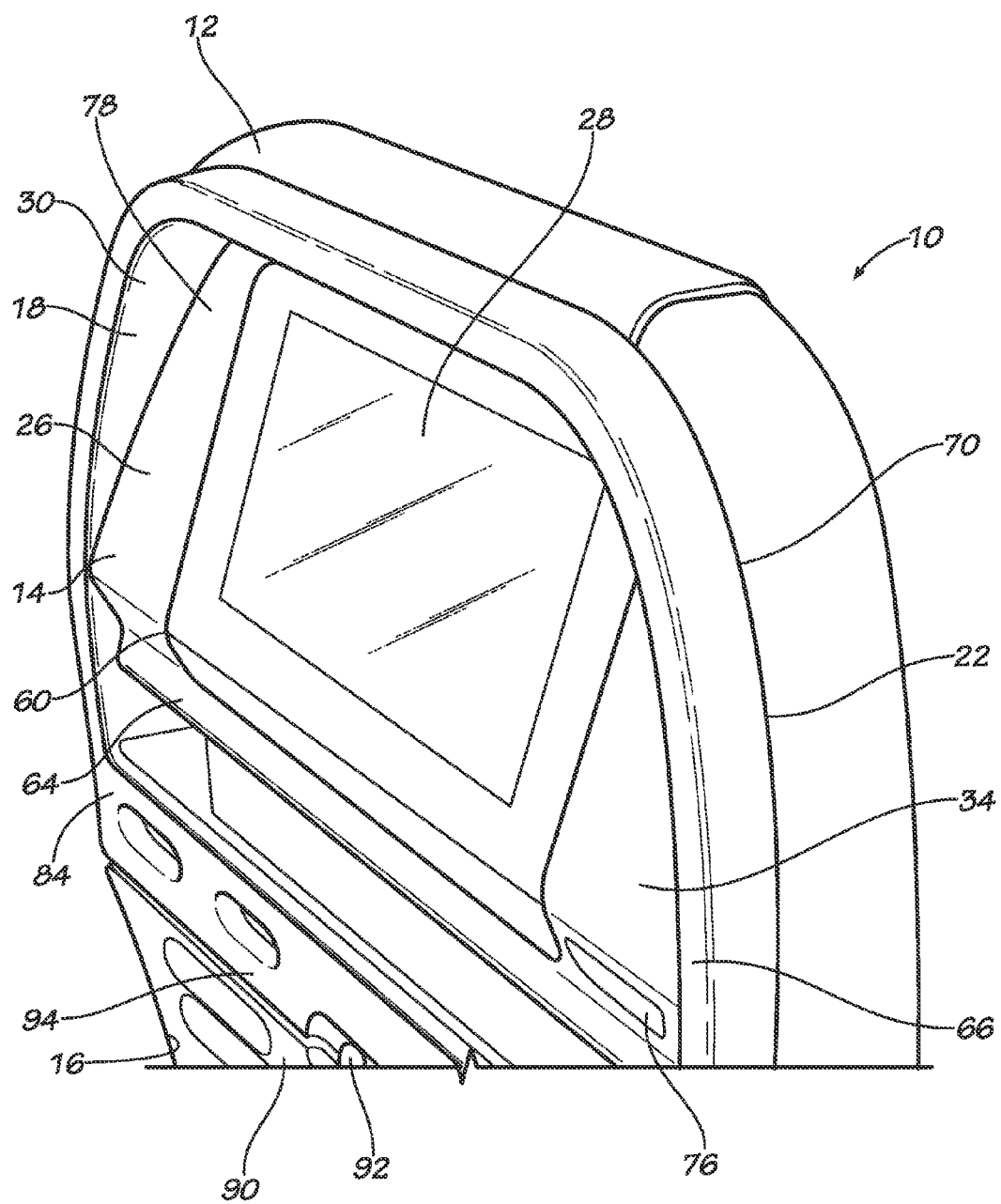
FIG. 10 is another partial front perspective view of the seat back assembly of FIG. 1 with a in-flight entertainment display.
Figure 13:
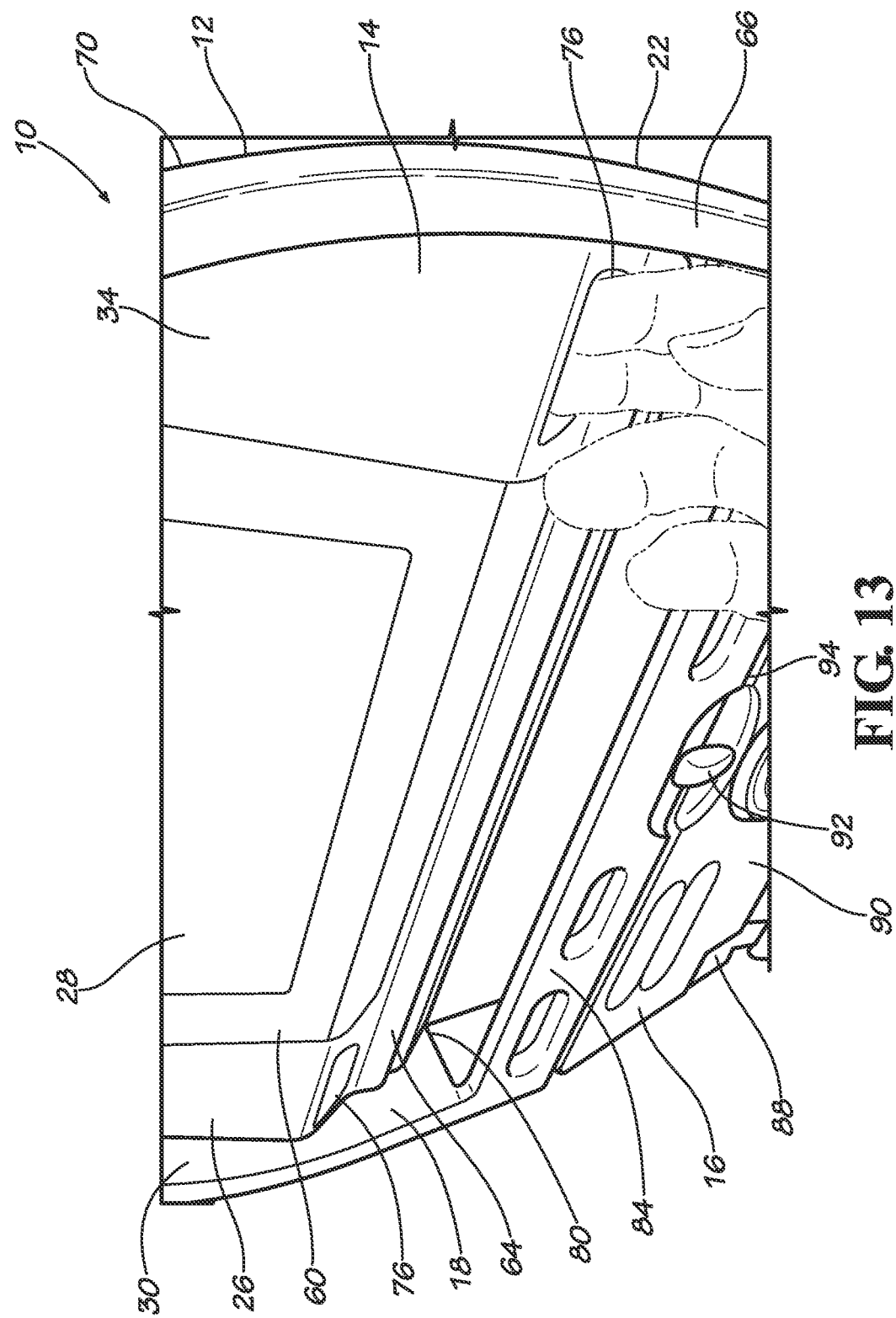
FIG. 13 is a partial front perspective view of the seat back assembly of FIG. 9 showing a passenger accessing the tilt access port.
Figure 14:
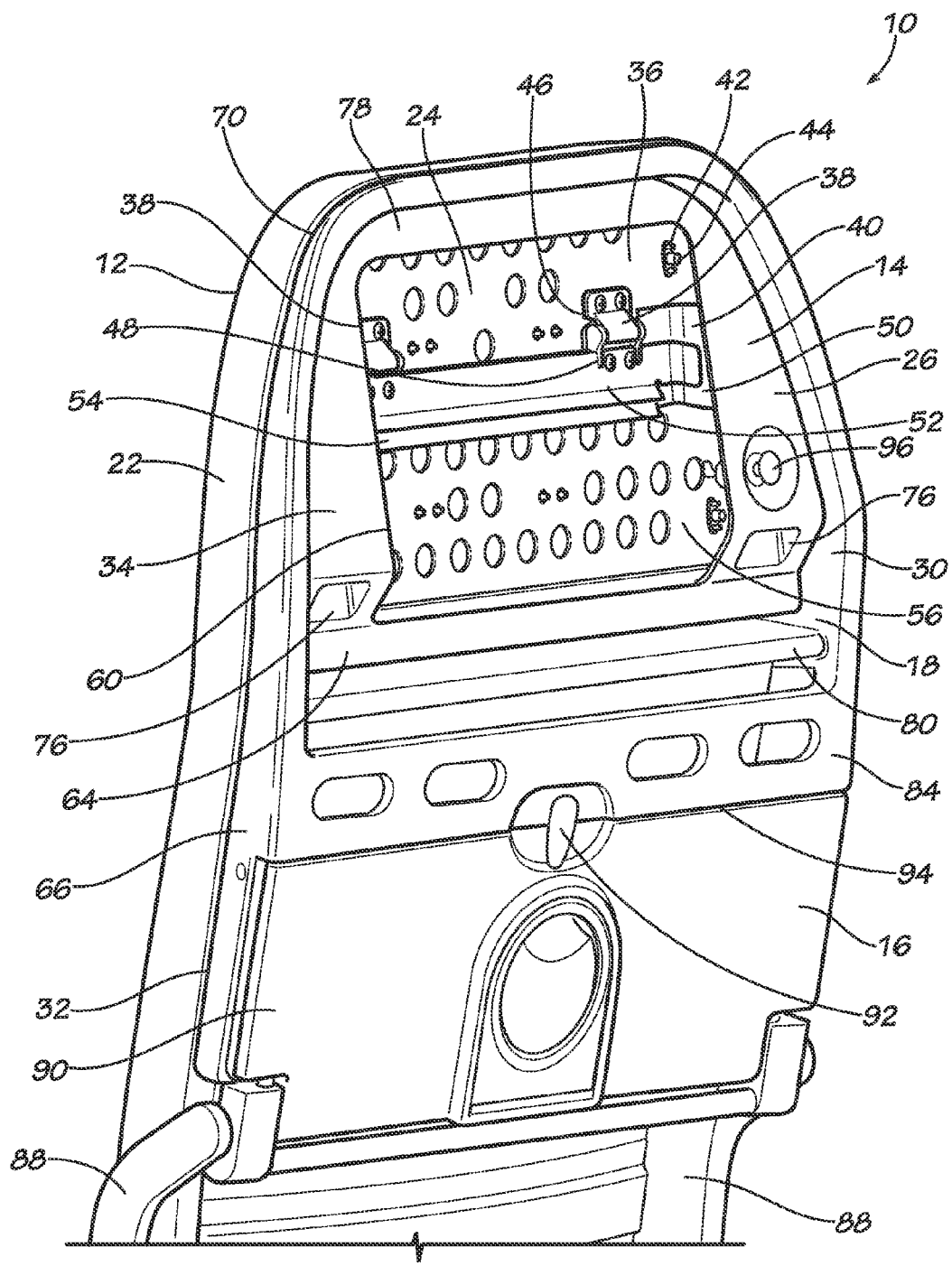
FIG. 14 is a front perspective view of the seat back assembly of FIG. 1 with a full shroud and tray table assembly.

In the embodiments illustrated in FIGS. 10 and 13-14, a latching mechanism 92 may be used to releasably engage the tray table assembly 16 with the bezel assembly 14 to maintain the tray table assembly 16 in a stowed position. In these embodiments, the latching mechanism 92 may be coupled to the shelf 80, so that the tray table assembly 16 is coupled to the shelf 80 when the tray table assembly 16 is stowed. In the embodiments where the amenity tray 84 is positioned below the shelf 80, the latching mechanism 92 may be positioned on a lower surface 94 of the amenity tray 84, so that the tray table assembly 16 is coupled to the lower surface 94 when the tray table assembly 16 is stowed.

In some embodiments, such as the embodiment shown in FIG. 14, the bezel assembly 14 may also include a coat hook 96, which is positioned on the aft surface 34 of the bezel 26 adjacent the aperture 60. The coat hook 96 is a spring loaded pin that may be pulled by a passenger to provide a location for hanging a coat, purse, bag, or other similar item.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A seat back assembly comprising:
   (a) a seat back comprising a recess formed by a back surface surrounded on at least three sides by a lip;
   (b) a shroud coupled to the recess within the seat back, wherein the shroud covers at least an inner surface of the lip of the recess;
   (c) a bezel pivotally coupled to the back surface of the recess, wherein the bezel comprises an aperture;
   (d) an in flight entertainment display comprising a screen mounted to a surrounding unit having edges that form an outer perimeter shape, wherein the edges of the surrounding unit contact and are fixedly coupled to an inner surface of the bezel proximate the aperture so that the edges of the surrounding unit are not accessible through the aperture; and
   (e) a shelf positioned below the bezel;
   (f) wherein the shroud and the shelf collectively surround upper, lower, and lateral surfaces of the bezel so that a gap located between the bezel and the back surface of the recess is not accessible when the bezel pivots between a stowed position and a fully tilted position.

2. The seat back assembly of claim 1, wherein the bezel is pivotally coupled to the back surface of the recess via at least one hinge coupled to the bezel.

3. The seat back assembly of claim 2, further comprising a tilt attachment plate coupled to the at least one hinge and fixedly coupled to the back surface of the recess.

4. The seat back assembly of claim 3, wherein the shroud is coupled to the recess via the fixed coupling between the back surface of the recess and the tilt attachment plate without additional fasteners.

5. The seat back assembly of claim 1, further comprising an amenity tray positioned adjacent the shelf.

6. The seat back assembly of claim 1, wherein the bezel has a thickness that approximates a depth of the recess.

7. The seat back assembly of claim 1, wherein the shroud is a full shroud or a partial shroud.

8. A seat back assembly comprising:
   (a) a seat back comprising an upper section and a lower section, wherein the upper section comprises a recess formed by a back surface surrounded on at least three sides by a lip;
   (b) a shroud coupled to the recess within the seat back, wherein the shroud covers at least an inner surface of the lip of the recess;
   (c) a bezel pivotally coupled to the back surface of the recess, wherein the bezel comprises an aperture;
   (d) an in flight entertainment display comprising a screen mounted to a surrounding unit having edges that form an outer perimeter shape, wherein the edges of the surrounding unit contact and are fixedly coupled to an inner surface of the bezel proximate the aperture so that the edges of the surrounding unit are not accessible through the aperture;
   (e) a shelf positioned below the bezel; and
   (f) a tray table assembly pivotally coupled to the lower section;
   (g) wherein the shroud and the shelf collectively surround upper, lower, and lateral surfaces of the bezel so that a gap located between the bezel and the back surface of the recess is not accessible when the bezel pivots between a stowed position and a fully tilted position.

9. The seat back assembly of claim 8, wherein the bezel is pivotally coupled to the back surface of the recess via at least one hinge coupled to the bezel.

10. The seat back assembly of claim 9, further comprising a tilt attachment plate coupled to the at least one hinge and fixedly coupled to the back surface of the recess.

11. The seat back assembly of claim 8, further comprising an amenity tray positioned adjacent the shelf.

12. The seat back assembly of claim 8, wherein the bezel has a thickness that approximates a depth of the upper section.

13. The seat back assembly of claim 8, wherein the shroud is a full shroud or a partial shroud.

14. A method of assembling a bezel assembly to a seat back comprising a recess formed by a back surface surrounded on at least three sides by a lip, the bezel assembly comprising (i) an in flight entertainment display comprising a screen mounted to a surrounding unit having edges that form an outer perimeter shape, (ii) a bezel comprising an aperture, wherein the edges of the surrounding unit contact and are fixedly coupled to an inner surface of the bezel proximate the aperture so that the edges of the surrounding unit are not accessible through the aperture, and (iii) a tilt attachment plate comprising a tilt bracket, wherein the bezel is pivotally coupled to the tilt bracket of the tilt attachment plate, the method comprising:
- (a) coupling a shroud to the recess within the seat back, wherein the shroud covers at least an inner surface of the lip of the recess;
- (b) coupling the tilt attachment plate to the back surface of the recess of the seat back; and
- (c) positioning a shelf below the bezel, wherein the shroud and the shelf collectively surround upper, lower, and lateral surfaces of the bezel so that a gap located between the bezel and the tilt attachment plate is not accessible when the bezel pivots between a stowed position and a fully tilted position.

15. The method of claim 14, further comprising coupling a stiffener to the tilt bracket.

16. The method of claim 14, wherein the shroud is a full shroud or a partial shroud.

\* \* \* \* \*